(12) United States Patent  
Reider et al.

(10) Patent No.: US 9,693,259 B2  
(45) Date of Patent: Jun. 27, 2017

(54) METHOD IN A BASE STATION, A BASE STATION, COMPUTER PROGRAMS AND COMPUTER READABLE MEANS

(75) Inventors: Norbert Reider, Ténýö (HU); László Hévízi, Piliscsaba (HU); Sándor Rácz, Cegléd (HU); Szilveszter Nádas, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 198 days.

(21) Appl. No.: 14/343,232

(22) PCT Filed: Sep. 8, 2011

(86) PCT No.: PCT/SE2011/051091  
§ 371 (c)(1),  
(2), (4) Date: Mar. 6, 2014

(87) PCT Pub. No.: WO2013/036183  
PCT Pub. Date: Mar. 14, 2013

(65) Prior Publication Data  
US 2014/0233391 A1   Aug. 21, 2014

(51) Int. Cl.  
*H04W 28/02* (2009.01)  
*H04W 72/04* (2009.01)  
(Continued)

(52) U.S. Cl.  
CPC ... *H04W 28/0289* (2013.01); *H04W 28/0205* (2013.01); *H04W 28/0247* (2013.01);  
(Continued)

(58) Field of Classification Search  
CPC ..... H04W 80/04; H04W 88/06; H04W 88/08; H04W 84/18; H04L 29/06  
(Continued)

(56) References Cited

U.S. PATENT DOCUMENTS 5,956,322 A * 9/1999 Charny ............... H04L 12/5601  
370/235  
6,690,646 B1 * 2/2004 Fichou ............... H04L 41/0896  
370/231  
(Continued)

FOREIGN PATENT DOCUMENTS

CN          101562889 A       10/2009

OTHER PUBLICATIONS

3GPP(TS 36.314, V10.1.0, Jun. 2011).*  
(Continued)

*Primary Examiner* — Maharishi Khirodhar  
*Assistant Examiner* — Sanjay K Dewan  
(74) *Attorney, Agent, or Firm* — Patent Portfolio Builders, PLLC (57) ABSTRACT

The invention relates to a method 20 in a base station 2 of a communication system 1 comprising a transport network 7 interconnecting the base station 2 with at least a gateway node 8. The communication system 1 further comprises one or more user equipment 3, 4 .The method 20 comprises: obtaining 21 transport network congestion information, and adjusting 22 , based on the transport network congestion information, a radio resource utilization parameter for at least one of the one or more user equipment 3, 4 , wherein the radio resource utilization parameter comprises a ratio of used radio resources in a predefined block of radio resources and the number of network congestion radio resources of the predefined block.

12 Claims, 7 Drawing Sheets

(51) Int. Cl.
*H04W 52/02* (2009.01)
*H04W 72/12* (2009.01)

(52) U.S. Cl.
CPC ... *H04W 52/0212* (2013.01); *H04W 72/0406* (2013.01); *H04W 72/1252* (2013.01); *Y02B 60/50* (2013.01)

(58) Field of Classification Search
USPC .................................. 370/229–237, 252–253
See application file for complete search history.

(56) References Cited

U.S. PATENT DOCUMENTS

| | | | | |
|---|---|---|---|---|
| 6,826,151 | B1* | 11/2004 | Li ....................... | H04L 12/5602 370/230.1 |
| 7,069,356 | B2* | 6/2006 | Meyer ..................... | H04L 47/10 370/235 |
| 7,221,656 | B1* | 5/2007 | Aweya .................... | H04L 47/10 370/229 |
| 7,260,062 | B2* | 8/2007 | Bowen, Jr. .............. | H04L 47/10 370/232 |
| 7,742,416 | B2* | 6/2010 | Charny ................... | H04L 47/10 370/232 |
| 2004/0071086 | A1* | 4/2004 | Haumont ............ | H04L 12/5602 370/230 |
| 2005/0188109 | A1* | 8/2005 | Shiga et al. ................ | 709/239 |
| 2005/0286416 | A1* | 12/2005 | Shimonishi et al. ........ | 370/229 |
| 2007/0153672 | A1* | 7/2007 | Terry ...................... | H04L 1/0025 370/206 |
| 2007/0153695 | A1* | 7/2007 | Gholmieh et al. ........... | 370/235 |
| 2008/0095053 | A1* | 4/2008 | Chen ..................... | H04L 47/215 370/230.1 |
| 2008/0170541 | A1* | 7/2008 | Vartiainen ........... | H04W 52/327 370/328 |
| 2008/0186892 | A1* | 8/2008 | Damnjanovic ............... | 370/311 |
| 2008/0267073 | A1* | 10/2008 | Thaler ........................ | 370/236 |
| 2009/0161647 | A1* | 6/2009 | Mestechkin ........... | H04B 1/707 370/342 |
| 2009/0161649 | A1* | 6/2009 | Ponnathota ............ | H04B 1/707 370/342 |
| 2010/0008331 | A1* | 1/2010 | Li ......................... | H04L 5/0026 370/335 |
| 2010/0105390 | A1* | 4/2010 | Ishii .................. | H04W 72/1242 455/436 |
| 2011/0022714 | A1* | 1/2011 | Nobukiyo ............ | H04J 11/0093 709/226 |
| 2011/0075563 | A1* | 3/2011 | Leung et al. ................ | 370/236 |
| 2011/0110312 | A1* | 5/2011 | Zhao ................. | H04W 72/1257 370/329 |
| 2011/0170414 | A1* | 7/2011 | Lee ..................... | H04L 41/5022 370/236 |
| 2011/0205889 | A1* | 8/2011 | Chen et al. ................... | 370/230 |
| 2011/0222406 | A1* | 9/2011 | Persson ................... | H04L 47/12 370/236 |
| 2011/0292851 | A1* | 12/2011 | Fong et al. .................... | 370/311 |
| 2011/0317627 | A1* | 12/2011 | Kato et al. ..................... | 370/328 |
| 2012/0039171 | A1* | 2/2012 | Yamada et al. ............... | 370/232 |
| 2012/0331478 | A1* | 12/2012 | Zhu .................. | H04W 72/0486 718/104 |
| 2014/0140313 | A1* | 5/2014 | Liu ..................... | H04W 52/346 370/329 |
| 2014/0185452 | A1* | 7/2014 | Kakadia ................ | H04W 28/12 370/236 |
| 2016/0072574 | A1* | 3/2016 | Xu ..................... | H04B 7/18586 370/230 |

OTHER PUBLICATIONS

TSG-RAN working group 3, R3-060266, Feb. 13-17, 2006.*
3GPP. "3rd Generation Partnership Project; Technical Specification Group Radio Access Network; Evolved Universal Terrestrial Radio Access (E-UTRA); Layer 2—Measurements (Release 10)." 3GPP TS 36.314 V10.1.0. Jun. 2011. 1-17.
Kolding et al. "Balancing Power Saving and Single User Experience with Discontinuous Reception in LTE." IEEE ISWCS 2008. 713-717.
Nadas et al. "HSPA Transport Network Layer Congestion Control." Ericsson Research, Budapest, Hungary. Publication date unavailable. 1-43.
Nadas et al. "HSUPA Transport Network Congestion Control." EURASIP Journal on Wireless Communications and Networking. vol. 2009. 1-11.
Unknown, Author. "Transport Network Congestion Control." Ericsson. 3GPP TSG RAN WG3 Meeting #46. R3-050095. Feb. 14-18, 2005. Scottsdale, AZ, USA. 1-2.
Unknown, Author. "Transport Network Congestion Detection and Control." Ericsson. Change Request 25.427. 3GPP TSG RAN WG3 Meeting #46. R3-050096. Feb. 14-18, 2005. Scottsdale, AZ, USA. 1-10.
Unknown, Author. "E-DCH TNL Congestion Control with Soft Handover." Seimens. TSG-RAN Working Group 3 meeting #51. R3-060266. Feb. 13-17, 2006. Denver, CO, USA. 1-5.
Unknown, Author. "S1-U TNL congestion indication." T-Mobile, Orange. 3GPP TSG-RAN WG3 Meeting #61. R3-082224. Jeju, S. Korea. Aug. 18-22, 2008. 1-5.
Unknown, Author. "TNL Congestion Indicator Enhancement." Alcatel-Lucent. 3GPP TSG-RAN3 Meeting #63. R3-090008. Athens, Greece. Feb. 9-13, 2009. 1-2.
Unknown, Author. "Enhancement of TNL Congestion Indicator." Alcatel-Lucent. Change Request 25.427. 3GPP TSG-RAN3 Meeting #63. R3-090009. Athens, Greece. Feb. 9-13, 2009. 1-3.
Wigard et al. "On the User Performance of LTE UE Power Savings Schemes with Discontinuous Reception in LTE." IEEE 2009. 1-5.

* cited by examiner

METHOD IN A BASE STATION, A BASE STATION, COMPUTER PROGRAMS AND COMPUTER READABLE MEANS

FIELD OF THE INVENTION

The invention relates generally to radio resource management, and in particular to radio resource management for reducing power consumption as well as interference.

BACKGROUND OF THE INVENTION

Power efficiency is an important issue in wireless communication networks, for user equipment as well as for base stations. Depending on type of traffic and system behavior there are time intervals when the user equipment would not need to monitor a downlink control signaling channel all the time. Power savings could thereby be obtained at least in the user equipment. In order to determine such time intervals, the traffic needs to be predictable. In case of traffic types such as voice over Internet Protocol (VoIP), which is a fairly predictable type of traffic, an Adaptive Multi-Rate (AMR) codec can determine these time intervals with high accuracy.

In order to utilize the energy-saving potential of predictable traffic, the concept of discontinuous reception (DRX) has been introduced in LTE (Long Term Evolution), which allows the user equipment to reduce its power consumption. The basic mechanism of DRX is the configurable DRX cycle of the user equipment, wherein the base station transmits configuration parameters instructing the user equipment when to enter DRX mode. With a specific DRX cycle configured the downlink control signaling is monitored only in one sub-frame per DRX cycle and the receiver circuit of the user equipment is switched off in the remaining sub-frames, whereby the desired power saving is achieved.

In LTE, the time scale of the DRX mechanism can be aligned to a certain delay tolerance of the type of traffic at hand. For example, a long DRX cycle can be used in intermissions of a file download. That is, DRX can be applied in idle periods of the traffic flow. A short DRX cycle can be used for delay sensitive traffic types.

In High Speed Downlink Packet Access (HSDPA), Continuous Packet Connectivity (CPC) is introduced, which is a mechanism similar to the LTE DRX and used for achieving power savings in the user equipment.

From the above it is clear that efforts have been made in developing power saving modes such as DRX for user equipment. Such power saving modes should be as long as possible and preferably for different types of traffic and there is room for improvement in this regards.

SUMMARY OF THE INVENTION

An object of the invention is to provide methods and devices for managing radio resources so as to maximize the time periods during which the user equipment is in a power saving mode such as DRX mode.

The object is according to a first aspect of the invention achieved by a method in a base station of a communication system comprising a transport network interconnecting the base station with at least a gateway node. The communication system further comprises one or more user equipment. The method comprises: obtaining transport network congestion information; and adjusting, based on the transport network congestion information, a radio resource utilization parameter for at least one of the one or more user equipment, wherein the radio resource utilization parameter comprises a ratio of used radio resources in a predefined block of radio resources and the number of radio resources of the predefined block.

In accordance with the invention transport network congestion information is taken account of and the information is used for improving radio resource management. The user equipment can reduce its power consumption since it can be instructed to go into discontinuous reception mode for longer durations. The base station may also reduce its power consumption by the radio resource management clustering the radio transmissions so as to provide longer idle time periods in the base station. Further, the improved radio resource management enabled by the use of transport network congestion information may also be directed towards lowering the level of inter-cell interference and/or increasing a cell-edge bit rate.

The object is according to a second aspect of the invention achieved by base station of a communication system comprising a transport network interconnecting the base station with at least a gateway node. The communication system further comprises one or more user equipment. The base station comprises: an input device for obtaining transport network congestion information; and a processor for adjusting, based on the transport network congestion information, a radio resource utilization parameter for at least one of the one or more user equipment, wherein the radio resource utilization parameter comprises a ratio of used radio resources in a predefined block of radio resources and the number of radio resources of the predefined block.

The object is according to a third aspect of the invention achieved by computer program for a base station of a communication system comprising a transport network interconnecting the base station with at least a gateway node. The communication system further comprises one or more user equipment. The computer program comprises computer program code, which, when run on the base station, causes the base station to perform the steps of: obtaining transport network congestion information, and adjusting, based on the transport network congestion information, a radio resource utilization parameter for at least one of the one or more user equipment, wherein the radio resource utilization parameter comprises a ratio of used radio resources in a predefined block of radio resources and the number of radio resources of the predefined block.

The object is according to a fourth aspect of the invention achieved by computer program product comprising a computer program as above, and a computer readable means on which the computer program is stored.

Further features and advantages of the invention will become clear upon reading the following description and the accompanying drawings.

DETAILED DESCRIPTION OF EMBODIMENTS

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail. Like numbers refer to like elements throughout the description.

Figure 1:
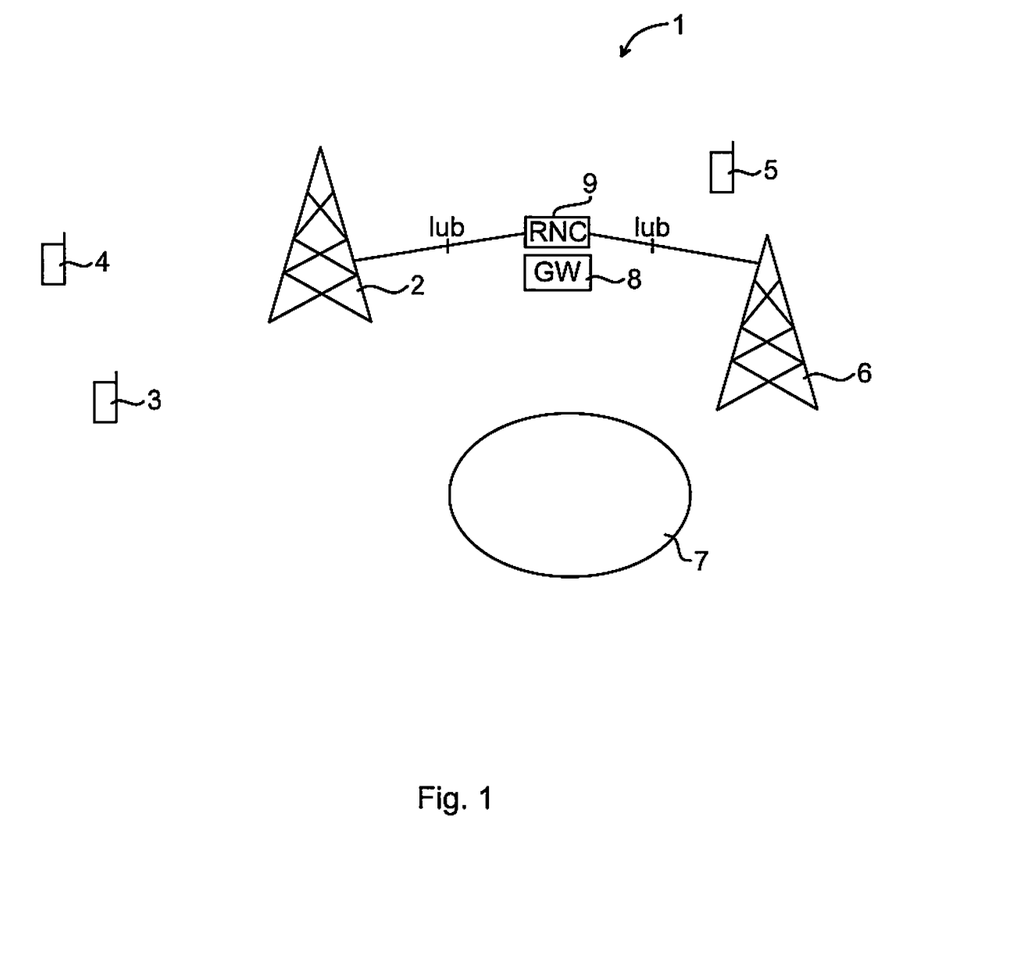
FIG. 1 illustrates schematically an environment in which embodiments of the invention may be implemented.

FIG. 1 illustrates schematically an environment in which embodiments of the invention may be implemented. A communication system 1 is illustrated comprising a base station 2 e.g. an evolved Node B, also denoted eNB, in LTE, arranged to communicate with user equipment 3, 4 using radio frequency transmitter(s) and receiver(s). The communication system 1 typically comprises yet further base stations 6 and the base stations 2, 6 each support one or more cells.

Depending on type of communication system, the communication network 1 may further comprise a Radio Network Controller 9 (RNC), which is responsible for controlling the one or more base station(s) 2 that are connected to it. The RNC 9 typically carries out e.g. radio resource management, encryption and some of the mobility management functions. The RNC 9 may be suitable for implementing methods of different embodiments of the present invention. It is noted that the functions of an RNC may be distributed among several devices having different locations within the communication system.

The base station 2, 6 may comprise a scheduling device 5, also denoted radio scheduler, suitable for implementing methods of different embodiments of the invention. It is realized that the base station 2, 6 comprises numerous further components, but only parts relevant for the present invention are described.

A transport network 7 is interconnecting the base stations 2, 6 and a central node, in the following denoted gateway node 8. The gateway node 8 may be part of the RNC 9 or a separate device. In WCDMA, for example, the transport network 7 is the network between the RNC 9 and the base stations 2, 6. The transport network 7 is used for delivering data packets, intended to a particular user, from the gateway node 8 to the base station 2, 6 to which the particular user is currently connected. In conventional manner, between the gateway node 8 and the base station(s) 2, 6 a tunneling mechanism is used for delivering such user data packets to the correct base station 2, 6, i.e. the base station to which the user equipment 3, 4 is currently connected. The gateway node 8 is thus arranged to route data packets to and from the user equipment 3, 4.

Exemplary transport network protocols comprise ATM (AAL2/ATM) and IP (UDP/IP) based solutions. For a LTE conforming communication system, the transport network is usually IP-based.

Transmission Time Interval (TTI), a type of radio resource, is a parameter in UMTS (and other digital telecommunication networks) related to encapsulation of data from higher layers into frames for transmission on the radio link layer. TTI refers to the length of an independently decodable transmission on the radio link. The TTI is related to the size of the data blocks passed from the higher network layers to the radio link layer.

In the following various aspects and embodiments of the invention will be described, and the above described "transmission time interval" is used for exemplifying a radio resource. Transmission time interval is a vocabulary used in LTE, but the invention is not limited to LTE adapted communication systems, and for other communication systems the applicable "radio resource" could be denoted otherwise.

Figure 2:
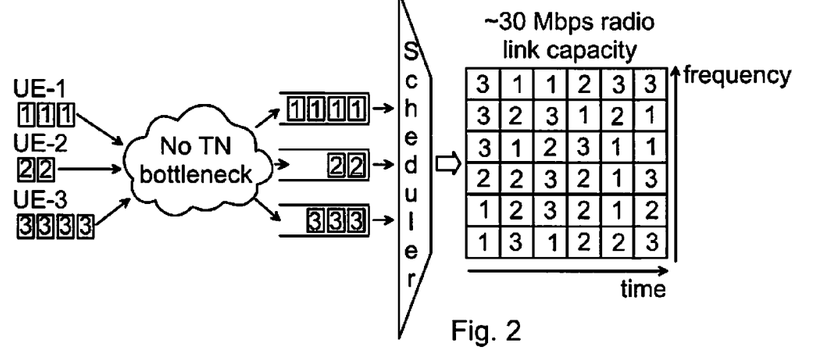
FIGS. 2 and 3 illustrate congestions situations of a communication system.
Figure 3:
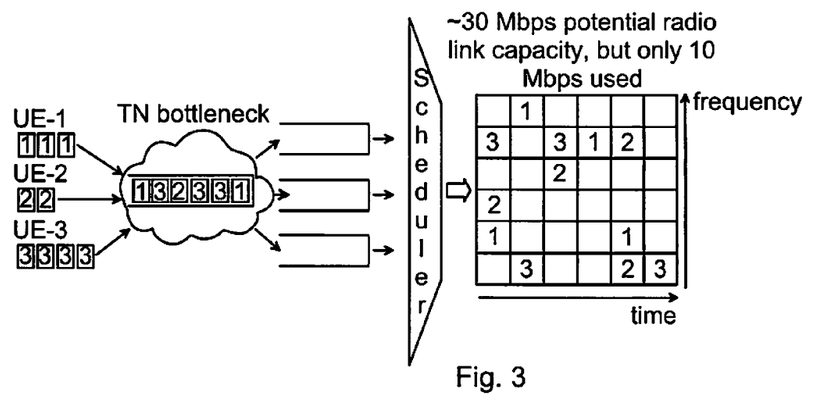

FIGS. 2 and 3 illustrate possible congestions situations of a communication system such as the communication system 1 of FIG. 1. For e.g. such situations, the present invention provides improvements in several aspects as will be described.

A transport network congestion detection mechanism is available in HSPDA networks today and the present invention may utilize such transport network congestion detection mechanism for obtaining transport network congestion information. Briefly, an Iub Framing Protocol (FP) is responsible for congestion detection and flow control, i.e. bit rate calculation, shaping etc. Upon detection of transport network congestion, it is known to adapt the bite rate. Standardized signaling messages are also available to inform the RNC about the transport network congestion.

Currently, in LTE the application level Transport Control Protocol (TCP) is used for implementing a transport network congestion control mechanism. This means that there is no standardized transport network congestion detection mechanism. For instance, any transport network node can indicate the transport network congestion using the protocol flag Explicit Congestion Notification (ECN). A transport network 7 congestion can, for example, be detected based on this ECN flag. In particular, if a node in the transport network detects congestion, then it may set this flag to 1 to notify the other nodes of the system that there is transport network congestion FIG. 2 illustrates a typical case wherein there is no transport network congestion and the radio interface is the bottleneck. In the scenario having no transport network congestion, data packets are queued at the radio scheduler 5 waiting for transmission over the air interface to the user equipment 3, 4. For example, data packets denoted "1" intended for a first user equipment UE-1 are transported through the transport network to the base station and queued in the radio scheduler. The corresponding is true for the second UE-2 and third user equipment UE-3.

FIG. 3 illustrates a case wherein the transport network is the bottleneck, i.e. the transport network is congested and the air interface is no longer the bottleneck of the communication system. As can be seen in FIG. 3, in the rightmost radio resource block, several transmission time intervals remain unused. Such unused transmission time intervals are illustrated as blank in the figure. The present invention provides methods and devices improving the situation occurring when the transport network is congested. In particular, although transmission time intervals still may remain unused, the invention manages the radio resources in an improved way so as to obtain advantages in terms of reduced power consumption and also reduced inter-cell interference. Briefly, the present invention takes into account transport network congestion information when managing radio resources and several advantages are obtained. The limitations of the transport network 7 can also result in predictable traffic regardless of type of traffic as will be shown. In one aspect, the invention utilizes transport network congestion information for reducing the power consumption of the user equipment 3, 4. In another aspect, the invention may also be used for decreasing interference generated in the communication system 1 by providing higher cell-edge bit rate or improved cell coverage.

In case of transport network 7 congestion the total amount of data arriving to the radio scheduler 5 has an upper limit restricted by the capacity of the transport network 7. If the traffic type is such that it tolerates some additional delay, e.g. 10-20 ms, the inventors of the present invention has found that it would be beneficial to delay the data already stored in the queue, wait for more data and then transmit the data in larger bursts to the user equipment 3, 4. In this case application of power saving modes such as DRX is very rational, i.e. the user equipment 3, 4 does not need to monitor the control channel in each transmission time interval. DRX parameters are set according to the delay between two consecutive transmission to the user equipment 3, 4. This is illustrated in FIG. 4.

Figure 4:
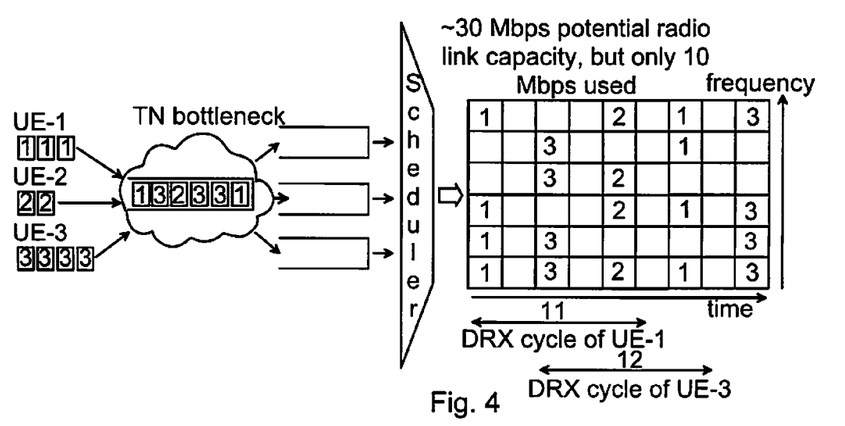
FIG. 4 illustrates an aspect of the invention for a transport network congestion situation.

FIG. 4 illustrates data packets for three user equipment UE1, UE2, UE3. Data packets intended for a first user equipment UE-1 are denoted with "1", data packets intended for a second user equipment UE2 are denoted with "2" and data packets intended for a user equipment third UE-3 are denoted with "3". The transport network 7 is congested and the data packets are queued e.g. in the gateway node 8. In the pipeline for transmission to the radio scheduler 5 there are illustrated two data packets for the first user equipment UE-1, one for the user equipment UE-2 and three for the third user equipment UE-3. In the queue, there are several data packets intended for the second and third user equipment UE-2, UE-3 between the first user equipment's two data packets. In accordance with the invention, the data packets for the first user equipment UE-1 are then queued in the radio scheduler 5 so as to enable transmission of them both (or more) simultaneously, instead of upon arrival. The first user equipment UE-1 can thereby be instructed to go into the power saving mode for a longer duration. The time interval during which the first user equipment UE-1 may go into DRX mode is indicated at reference numeral 11, above the arrow along the time line in FIG. 4. This can be compared to the situation illustrated in FIG. 3, wherein the data packets are transmitted upon arrival to the radio scheduler 5. To queue the data packets intended for the first user equipment UE-1 in the radio scheduler 5 before transmission thus provides a great advantage. The corresponding DRX cycle for the third user equipment UE-3 is illustrated at the arrow denoted 12.

Figure 5:
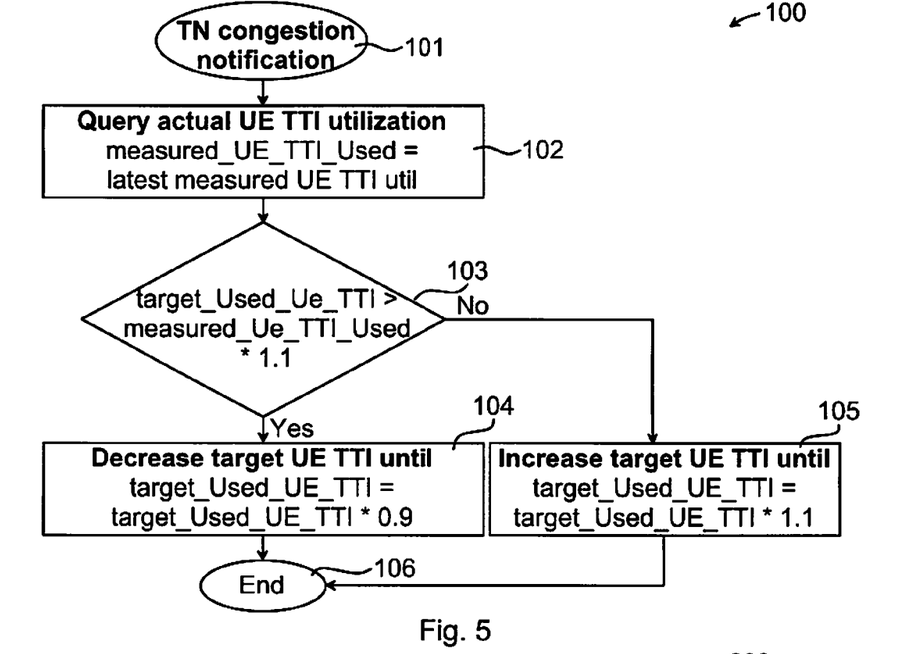
FIG. 5 illustrates a flow chart of a first algorithm for configuring a user equipment.

FIG. 5 illustrates a flow chart of a first algorithm 100 for configuring and setting a power saving mode parameter, e.g. a DRX parameter. At box 101 a transport network 7 congestion is detected and notified to the base station 2, e.g. to the radio scheduler 5. The detection of a transport network 7 congestion can be performed in different ways, for example using an ECN flag as described earlier.

At box 102, the actual user equipment (UE1, UE2, UE3) transmission time interval (TTI) utilization is determined. A variable providing a measure on actual number of used transmission time intervals is denoted measured_UE_TTI_Utilization and set equal to a latest measured number of used user equipment transmission time intervals.

At box 103, the variable measured_UE_TTI_Utilization multiplied with a settable constant c (equal to 1.1 in the illustrated case) is compared to a variable defining a desired number of used transmission time intervals of the user equipment. This variable is denoted target_used_UE_TTI.

If the comparison of box 103 reveals that target_used_UE_TTI>measured_UE_TTI_Utilization*c is true, then the flow continues to box 104. In box 104, the target_used_UE_TTI is decreased by decreasing the constant c (to 0.9 in the illustrated case) and setting target_used_UE_TTI=target_used_UE_TTI*c.

If the comparison of box 104 reveals that that target_used_UE_TTI >measured_UE_TTI_Utilization*c is not true, then the flow continues to box 105. In box 104, the target_used_UE_TTI is increased by multiplying the target_used_UE_TTI with the initially set constant c (c=1.1 in the illustrated case) and thus setting target_used_UE_TTI=target_used_UE_TTI*c.

The flow ends in box 106.

The first algorithm 100 is triggered by transport network 7 congestion information from a suitable network device e.g. from the RNC 9. The transport network congestion information may relate to the data flow of a particular user equipment. That is, the transport network congestion information may be provided from a transport network 7 related device, but per user equipment. In particular, a protocol stack that detects transport network congestion exists for each user equipment. The user equipment's target_used_UE_TTI variable is set equal to the current TTI utilization of the user equipment. This variable is ranged between 0.0 and 1.0 and expresses the ratio of used TTIs in a predefined block of TTIs denoted variable block_size_TTI (not illustrated in the FIG. 5).

Figure 6:
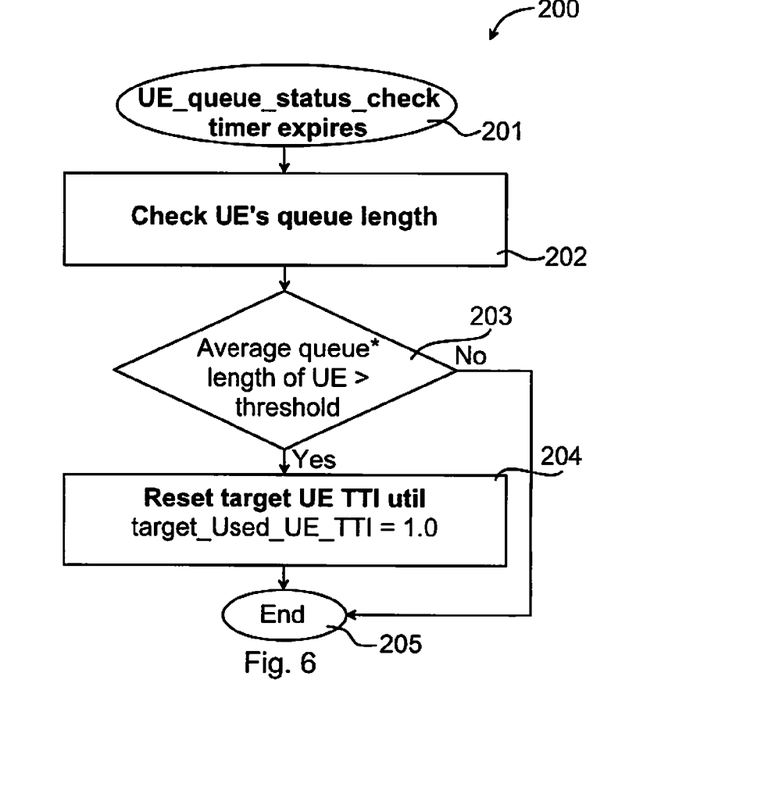
FIG. 6 illustrates a flow chart of a second algorithm for configuring a user equipment.

FIG. 6 illustrates a flow chart of a second algorithm 200 for configuring and setting a power saving mode parameter, e.g. a DRX parameter. At box 201, a timer that is set to regularly check user equipment queue status expires.

At box 202, the queue length of a user equipment is determined, for example determining the number of data packets, or more specifically number of bytes, in queue for the user equipment.

At box 203, an average queue length of the user equipment is compared to a threshold value. The average queue length can comprise a moving average taken between the last two or more, typically several, TTIs when the user equipment has been scheduled.

If the comparison of box 203 of box 203 reveals that the average queue length of the user equipment is lower than the set threshold value, then the flow ends in box 205.

If the comparison of box 203 reveals that the average queue length of the user equipment is higher than the set threshold value, then the flow continues to box 204.

At box 204, the variable target_used_UE_TTI is reset to its maximum value, i.e. target_used_UE_TTI=1.0.

The flow ends in box 205.

The second algorithm 200 can be executed periodically, for example upon expiry of a timer (e.g. every 100 ms). This algorithm 200 handles sudden radio link or radio node capacity drops by setting the target variable immediately to its maximum value of 1.0, which disables the transport network flow control influence on radio scheduling in the radio scheduler 5.

Figure 7:
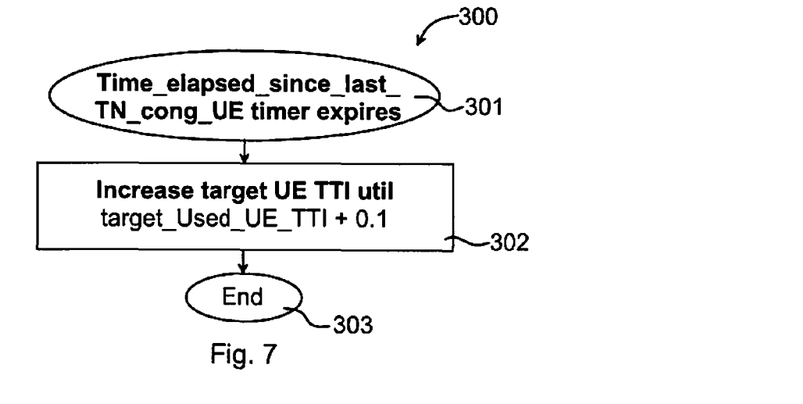
FIG. 7 illustrates a flow chart of a third algorithm for configuring a user equipment.

FIG. 7 illustrates a flow chart of a third algorithm 300 for configuring and setting a power saving mode parameter, e.g. a DRX parameter.

At box 301, a timer is set to expire when a set time period since last received transport network congestion information for the user equipment has lapsed. Once the timer is expired, the flow continues to box 302.

At box 302, the target user equipment transmission time interval utilization is increased, by setting target_used_UE_TTI=target_used_UE_TTI+0.1.

The flow ends in box 303.

The third algorithm 300 can be run when a predefined time (e.g. 1-2 seconds) has elapsed since the reception of the last transport network congestion information. The target used TTI of the user equipment is increased in order not to limit the radio link capacity when it is not reasonable. That is, if there is no transport network congestion, the data packets for the user equipment should not be queued in the radio scheduler 5 unnecessarily.

For the particular case illustrated in FIG. 4 the block_size_TTI is equal to 9, the ratio of target used TTIs for the first UE1 is set to target_used_UE_TTI=2/9*1.1=0.24 according to the first algorithm 100. The variable target_used_UE_TTI can now be mapped into actual DRX cycle values, e.g. according to table 1 below (still using the example illustrated in FIG. 4).

TABLE 1

| target_used_UE_TTI | DRX cycle (in nr. of TTIs) |
|---|---|
| 0.0-0.11 | 8 |
| 0.12-0.22 | 7 |
| ... | ... |
| 0.89-1.0 | 0 |

In an embodiment, the algorithms described in FIGS. 5-7 are arranged to run simultaneously in the base station 2, but in other embodiments only one is run or two are run simultaneously.

By applying the algorithms 100, 200, 300 a proper DRX cycle can be configured and adjusted for the user equipment upon detection of transport network congestion. Hence the flow control using standardized control messages is combined with the DRX mechanism switching off receiver circuitry of user equipment can save significant amount of power at the user equipment and potentially also at the base station side.

It can be noted that the algorithms may for some instances result in an additional delay, which at most is as long as the DRX cycle, and if implemented for highly delay sensitive traffic types a somewhat decreased user satisfaction may result.

As described earlier, in case of transport network congestion, there are unused resource blocks on the air interface. In such case, the start of the radio transmissions to user equipment in a cell can be aligned based on some policy, e.g. such that the transmissions are reduced. In another aspect of the invention, the provided improved radio resource scheduling is used for combatting interference related drawbacks. In particular, an increased cell-edge bit rate and/or reduce inter-cell interference can be provided.

An additional benefit of grouping downlink transmissions in the time domain is that sub-frame level DRX cycles can be also configured for the base station transmitters, which can go into a reduced power consumption operation mode for the silent intervals.

Figure 8A:
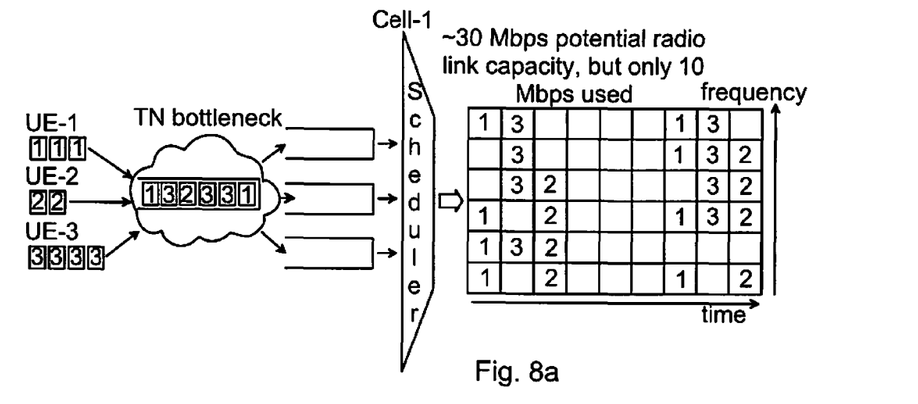
FIGS. 8*a* and 8*b* illustrate another aspect of the invention, and in particular alignment of downlink transmissions in the downlink.
Figure 8B:
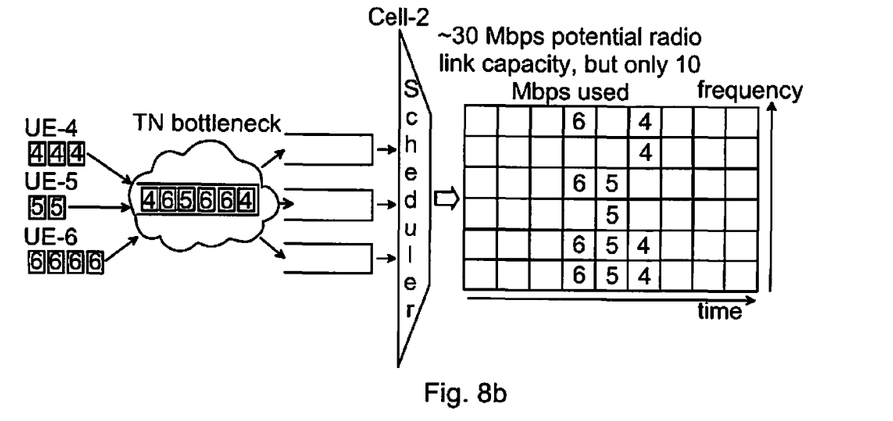

FIGS. 8*a* and 8*b* illustrate this aspect of the invention, and in particular the alignment of downlink transmissions in the downlink. FIG. 8*a* illustrates the alignment of data packet transmission for three user equipment: UE1, UE2 and UE3 located in a first cell CELL-1 served by a first base station.

FIG. 8*b* illustrates the alignment of data packet transmission for additional three user equipment: UE4, UE5 and UE6 located in a second cell CELL-2 served by a second base station.

From FIGS. 8*a* and 8*b* it can be seen that the data packets intended for the six user equipment UE1, UE2, UE3, UE4, UE5, UE6 can be aligned for reducing inter-cell interference. The transmissions of data packet for the various user equipment in the respective cell are thus coordinated between the base stations 2, 6 e.g. in view of minimizing interference between the cells.

There exists a standardized downlink signaling message (Relative Narrowband Transmit Power, RNTP) which can be sent over an X2 interface (or more generally any interface between base stations) to provide information about the usage of each resource blocks. For example, whether or not the relative transmit power of the resource block exceeds a certain level. The information conveyed by these messages serves, in an embodiment, as a basis for self-organizing network algorithm, which arranges the active time intervals among neighboring base stations 2, 6 operating under transport network limitation.

Figure 9:
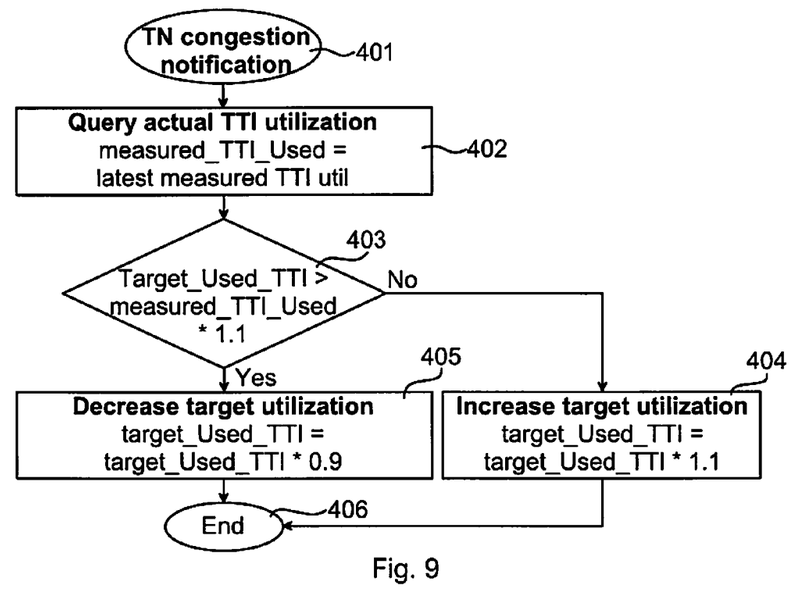
FIG. 9 illustrates flow chart of a first algorithm 400 for providing increased cell-edge bit rate.

FIG. 9 illustrates flow chart of a first algorithm 400 for providing increased cell-edge bit rate. At box 401 a transport network 7 congestion is detected and notified to the base station 2, e.g. to the radio scheduler 5. The detection of a transport network 7 congestion can be performed in different ways, for example using an ECN flag as described earlier.

At box 402, the actual transmission time interval (TTI) utilization is determined. A variable providing a measure on actual number of used transmission time intervals is denoted measured_TTI_Used and set equal to a latest measured number of used transmission time intervals.

At box 403, the variable measured_TTI_Utilization multiplied with a settable constant c (c is equal to 1.1 in the illustrated case) is compared to a variable defining a desired number of used transmission time intervals. This variable is denoted target_used_TTI.

If the comparison of box 403 reveals that target_used_TTI>measured_TTI_Utilization*c is true, then the flow continues to box 405. In box 405, the target_used_TTI is decreased by decreasing the constant c (to 0.9 in the illustrated case) and setting target_used_TTI=target_used_TTI*c.

If the comparison of box 404 reveals that that target_used_TTI measured TTI_Utilization*c is not true, then the flow continues to box 404. In box 404, the target_used_TTI is increased by multiplying the target_used_TTI with the initially set constant c (1.1 in the illustrated case) and thus setting target_used_TTI=target_used_TTI*c.

The flow ends in box 406.

The first algorithm 400 for providing increased cell-edge bit rate thus corresponds to the first algorithm 100 for configuring and setting a power saving mode parameter described in relation to FIG. 5. In the algorithm 400 for providing increased cell-edge bit rate, the target_used_TTI is adjusted continuously according to the actual TTI utilization in the entire cell and not per user equipment (as in algorithm 100).

Figure 10:
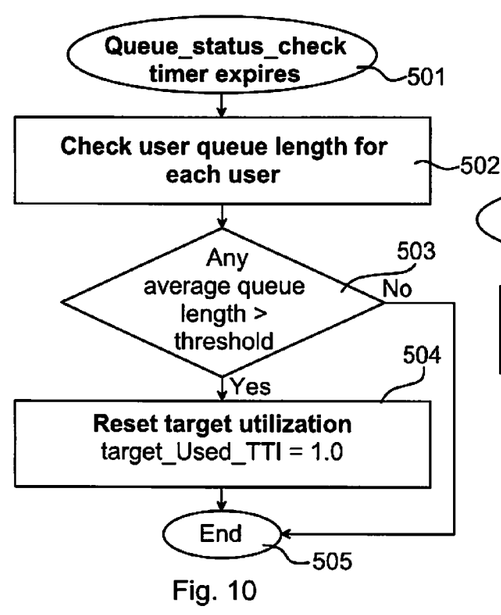
FIG. 10 illustrates flow chart of a second algorithm 500 for providing increased cell-edge bit rate.

FIG. 10 illustrates a flow chart of a second algorithm 500 for providing increased cell-edge bit rate. At box 501, a timer that is set to regularly check queue status expires.

At box 502, the queue length of for each user equipment are determined, for example determining the number of data packets in queue for the respective user equipment.

At box 503, the average queue lengths for the respective user equipment are compared to a threshold value. The average queue length can comprise a moving average taken between the last TTIs when the user equipment has been scheduled, respectively.

If the comparison of box 503 reveals that the average queue length of any of the user equipment is lower than the set threshold value, then the flow ends in box 505.

If the comparison of box 503 reveals that the average queue length of any of the user equipment is higher than the set threshold value, then the flow continues to box 504.

At box 504, the variable target_used_ TTI is reset to its maximum value, i.e. target_used_TTI=1.0.

The flow ends in box 505.

As for the preceding algorithm (first algorithm 400), the target_used_TTI is adjusted in view of the actual TTI utilization in the entire cell.

Figure 11:
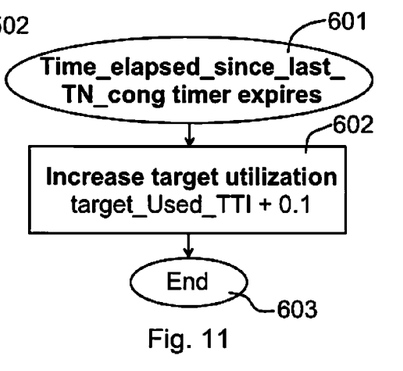
FIG. 11 illustrates flow chart of a third algorithm 600 for providing increased cell-edge bit rate.

FIG. 11 illustrates flow chart of a third algorithm 600 for providing increased cell-edge bit rate. At box 601, a timer is set to expire when a set time period since last received transport network congestion information for the user equipment has elapsed. Once expired, the flow continues to box 602.

At box 602, the target transmission time interval utilization is increased, by setting target_used_TTI=target_used_TTI+0.1.

The flow ends in box 603.

The logic behind the above algorithms 400, 500, 600 is similar to that of algorithms 100, 200, 300, but in the former cases (400, 500, 600) a target TTI utilization variable called target_used_TTI is adjusted continuously according to the actual TTI utilization in the entire cell and not per user equipment as in the latter cases (100, 200, 300).

Referring again to FIG. 8a, illustrating the situation in the first cell CELL-1, the block_size_TTI is equal to 9, the target_used_TTI is equal to 6/(9*1.1)=0.72. This value can be mapped to the number of TTIs occupied in that cell, as illustrated below in Table 2:

TABLE 2

| Target_used_TTI | Nr. of used TTIs | Nr. of empty TTIs (available for interference coordination) |
|---|---|---|
| 0.0-0.11 | 1 | 8 |
| 0.12-0.22 | 2 | 7 |
| ... | ... | ... |
| 0.89-1.0 | 9 | 0 |

Figure 12:
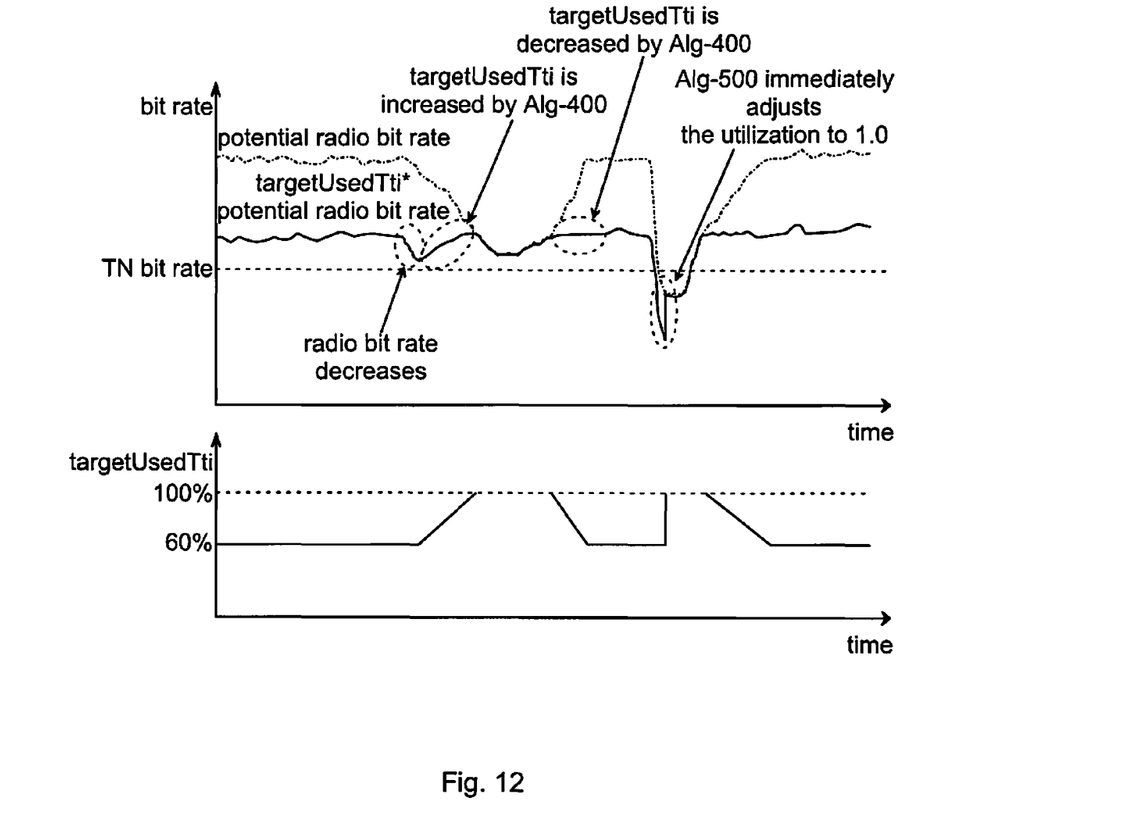
FIG. 12 illustrates aspects of the operation of the algorithms of FIGS. 9, 10 and 11

FIG. 12 illustrates the operation of the algorithms 400, 500, 600 for providing increased cell-edge bit rate. From the FIG. 12 it can be seen that when the potential radio throughput starts decreasing (e.g. there are more cell edge users in the cell), algorithm 400 reacts by increasing the output variable target_used_TTI up to 1.0 (or 100%) as illustrated in the lower part of FIG. 12. When the potential radio bit rate increases (e.g. more users are close to the base station) then algorithm 400 adapts to the situation and starts decreasing the utilization variable target_used_TTI. However, in some cases it is possible that the radio degrades immediately (also illustrated in FIG. 12) and in that case, algorithm 500 is responsible for quickly updating the target utilization variable to 100% in order not to send the user equipment into sleep mode when the radio air interface becomes the bottleneck of the system. Otherwise it would limit the achievable capacity of the user equipment.

The application of these algorithms 400, 500, 600 is beneficial especially for the cell-edge users, since the inter-cell interference can be significantly reduced if neighbor cells coordinate the TTIs that they schedule. Owing to the lower level of interference that is achieved, this solution results in an improved coverage as well.

In an embodiment, the algorithms described in FIGS. 9-11 are arranged to run simultaneously in the base station 2, but in other embodiments only one is run or two are run simultaneously.

Figure 13:
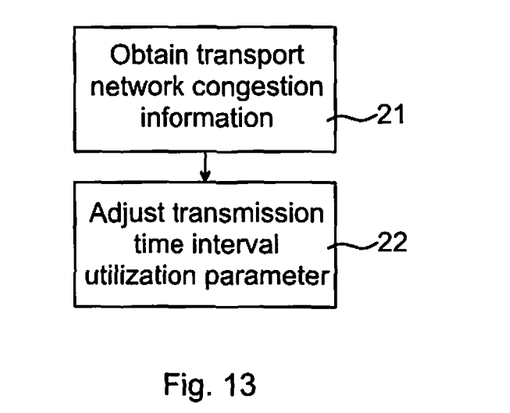
FIG. 13 illustrates steps of a method in accordance with the invention.

FIG. 13 illustrates steps of a method 20 performed in a base station 2, 6 of the communication system 1 comprising the transport network 7, that interconnects the base stations 2, 6 with at least the gateway node 8. As described, the communication system 1 further comprises one or more user equipment 3, 4. The method 20 comprises a first step 21 of obtaining transport network congestion information, which can be done as described earlier.

The method 20 comprises a second step of adjusting 22, based on the transport network congestion information, a radio resource utilization parameter for at least one of the one or more user equipment 3, 4. The radio resource utilization parameter comprises a ratio of used radio resources in a predefined block of radio resources and the number of radio resources of the predefined block. By taking into account possible congestion in the transport network 7, and adapting the radio resource management based thereon, the power consumption of the user equipment 3, 4 and also the base stations 2, 6 can be reduced.

In a first embodiment of the method 20 the radio resource utilization parameter comprises a ratio of actually used radio resources for one user equipment 3, 4 connected to the base station 2, 6 in the predefined block of radio resources and the number of radio resources of the predefined block. Particularly, for the described example of the communication system 1 being a LTE adapted system, this would be the ratio target_used_UE_TTI/block_size_TTI.

In a variation of the first embodiment, the adjusting of the radio resource utilization parameter comprises:
  comparing the radio resource utilization parameter with a latest measured radio resource utilization parameter, and
  increasing the radio resource utilization parameter if the latest measured radio resource utilization parameter is below a threshold value and decreasing the radio resource utilization parameter if the latest measured radio resource utilization parameter is above the threshold value. For the described example of the communication system 1 being a LTE adapted system, this would correspond to boxes 103, 104, 105 of FIG. 5.

In another variation of the first embodiment, or as additional steps to the above variation, the method 20 comprises the further steps of:
  determining a discontinuous reception parameter for the user equipment 3, 4 based on the radio resource utilization parameter, and
  transmitting to the user equipment 3, 4 the discontinuous reception parameter, enabling the user equipment 3, 4 to go into a discontinuous reception mode.

In still a variation of the above described variations, the method 20 comprises the further steps of:

determining a queue length for the user equipment 3, 4, the queue length comprising time elapsed since last transmission of data to the user equipment 3, 4, resetting the radio resource utilization parameter for the user equipment 3, 4 if an average queue length is above a set queue length threshold.

For the described example of the communication system 1 being a LTE adapted system, this would correspond to boxes 202, 203, 204 of FIG. 6.

The step of determining the queue length and resetting the radio resource utilization parameter can be performed periodically.

The first embodiment can comprise a step of mapping the variable target_used_UE_TTI into a DRX cycle value. For example, for a target_used_UE_TTI equal to 0.11, the base station could instruct the user equipment to go into DRX mode during 8 radio resources (e.g. transmission time intervals, refer to Table 1).

In a second embodiment of the method 20, the radio resource utilization parameter comprises a ratio of used radio resources for all user equipment 3, 4 connected to the base station 2, 6 in the predefined block of radio resources and the number of radio resources of the predefined block. Particularly, for the described example of the communication system 1 being a LTE adapted system, this would be the ratio target_used_TTI/block_size_TTI.

In a variation of the above second embodiment, the adjusting of the radio resource utilization parameter comprises aligning the radio resources for all user equipment 3, 4 so as to be grouped in time within the predefined block of radio resources. Thereby inter-cell interference can be reduced, and/or cell-edge bit rate can be increased.

In another variation of the second embodiment, or as additional steps to the above variation, the method 20 comprises the steps of:

determining a queue length for each user equipment 3, 4, the queue lengths comprising time elapsed since last transmission of data to the respective user equipment 3, 4, and resetting the radio resource utilization parameter if any average queue length is above a set queue length threshold.

For the described example of the communication system 1 being a LTE adapted system, this would correspond to boxes 502, 503, 504 of FIG. 10.

The step of determining the queue lengths and resetting the radio resource utilization parameter can be performed periodically.

The second embodiment can comprise a step of mapping the variable target_used_TTI to a number of TTIs occupied in that cell. For example, for a Target_used_TTI equal to 0.11, the base station would have 8 radio resources (e.g. transmission time intervals, refer to Table 2) available for interference coordination.

For all the preceding embodiments, the method 20 may comprise the further step of increasing the radio resource utilization parameter when a time elapsed since last transport network congestion information was obtained equals a preset time period. For the described example of the communication system 1 being a LTE adapted system, this would correspond to boxes 301, 302 of FIG. 7 or boxes 601, 602 of FIG. 11.

Depending on the type of communication system, the transport network congestion information may comprise for example a field in an Internet Protocol (IP) header.

In case of the communication system 1 being a LTE adapted system, the radio resource would typically comprise a transmission time interval.

Figure 14:
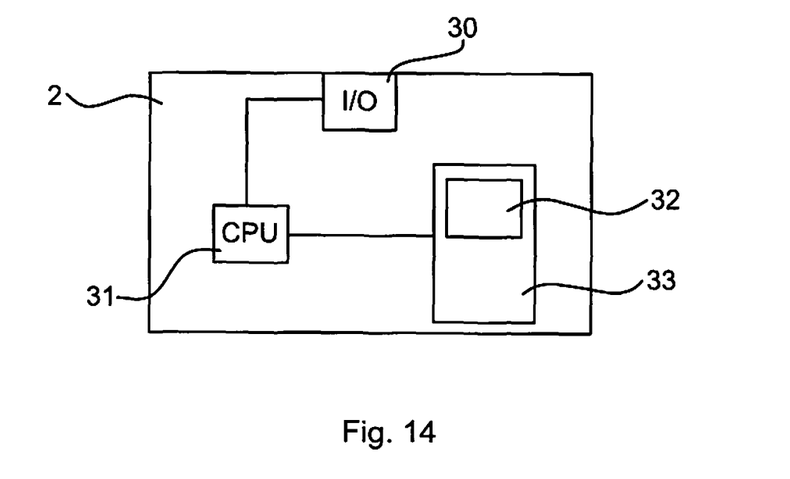
FIG. 14 illustrates an exemplifying device for implementing methods in accordance with the invention.

FIG. 14 illustrates an exemplifying way of implementing the methods as described in the base station 2, 6. The base station 2, 6 may comprise the radio scheduler 5, or some other device, arranged to perform the methods as described.

With reference now to FIG. 14, the invention also encompasses a base station 2, 6 of the communication system 1 comprising the transport network 7 interconnecting the base station 2, 6 with at least the gateway node 8. The base station 2, 6 comprises an input device 30, for example a congestion detection module, for obtaining transport network congestion information.

The base station 2, 6 further comprises a processor 31, e.g. a central processing unit, microcontroller, digital signal processor (DSP), etc., capable of executing software instructions stored in a computer program product 32 e.g. in the form of a memory. The processor 31 is connected to the input device 30 The processor is arranged to adjust, based on the transport network congestion information received from the input device 30, a radio resource utilization parameter for at least one of the one or more user equipment 3, 4. The radio resource utilization parameter comprises a ratio of used radio resources in a predefined block of radio resources and the number of radio resources of the predefined block.

The described methods and algorithms or parts thereof for reducing power consumption and/or inter-cell interference and/or increasing cell-edge bit rate may be implemented e.g. by software and/or application specific integrated circuits in the processor 31. To this end, the base station 2, 6 may further comprise a computer program 32 stored on a computer program product 33.

With reference still to FIG. 14, the invention thus also encompasses a computer program 32 for a base station 2, 6 as described. The computer program 32 comprises computer program code, which, when run on the base station 2, 6 causes the base station 2, 6 to perform the steps of:

obtaining transport network congestion information, and adjusting, based on the transport network congestion information, a radio resource utilization parameter for at least one of the one or more user equipment 3, 4, wherein the radio resource utilization parameter comprises a ratio of used radio resources in a predefined block of radio resources and the number of radio resources of the predefined block.

With reference still to FIG. 14, the invention also encompasses a computer program product 33 comprising a computer program 32 as described above, and a computer readable means on which the computer program 32 is stored. The computer program product 33 can be any combination of read and write memory (RAM) or read only memory (ROM). The computer program product 33 may also comprise persistent storage, which, for example can be any single one or combination of magnetic memory, optical memory, or solid state memory.

In a radio communication system, there are many competing improvement goals, the optimization of which sometimes may require compromises. Energy efficiency is, as described above, an important aspect, but so is e.g. interference reduction and customer satisfaction. For example, energy saving methods such as DRX should be accomplished without the user missing data intended for it, which would decrease user satisfaction. The invention provides in different aspects, means for addressing both power consumption aspects and interference aspects. The improved methods and devices implementing the methods, provide an improved radio resource management which can be used for e.g. the mentioned power consumption and interference aspects. The invention enables a power saving mode, such as DRX, also for more unpredictable traffic.

The invention claimed is:

1. A method in a base station of a communication system that comprises a transport network interconnecting the base station with at least a gateway node and that further comprises one or more user equipments, the method comprising:
obtaining transport network congestion information;
adjusting, based on the transport network congestion information, a radio resource utilization parameter for at least one user equipment of the one or more user equipments, wherein the radio resource utilization parameter comprises a ratio of an actual number of used radio resources for the at least one user equipment in a predefined radio resource block to a total number of radio resources in the predefined radio resource block;
determining a discontinuous reception parameter for the at least one user equipment based on the radio resource utilization parameter; and
transmitting, to the at least one user equipment, the discontinuous reception parameter, enabling the at least one user equipment to go into a discontinuous reception mode.

2. The method of claim 1, wherein adjusting of the radio resource utilization parameter comprises:
comparing the radio resource utilization parameter with a latest measured radio resource utilization parameter; and
decreasing the radio resource utilization parameter if the latest measured radio resource utilization parameter is below a threshold value and increasing the radio resource utilization parameter if the latest measured radio resource utilization parameter is above the threshold value.

3. The method of claim 1, further comprising:
determining a queue length for the at least one user equipment, the queue length comprising time elapsed since last transmission of data to the at least one user equipment; and
resetting the radio resource utilization parameter for the at least one user equipment if an average queue length is above a set queue length threshold.

4. The method of claim 3, wherein the determining the queue length and resetting the radio resource utilization parameter are performed periodically.

5. The method of claim 1, wherein the radio resource utilization parameter comprises a ratio of number of used radio resources for all of the one or more user equipments connected to the base station in the predefined radio resource block to the total number of radio resources in the predefined radio resource block.

6. The method of claim 5, further comprising aligning the radio resources for all of the one or more user equipments so as to be grouped in time within the predefined radio resource block.

7. The method of claim 5, further comprising:
determining a queue length for each of the one or more user equipments, the queue lengths comprising time elapsed since last transmission of data to the respective user equipment; and
resetting the radio resource utilization parameter if any average queue length is above a set queue length threshold.

8. The method of claim 7, wherein the determining the queue lengths and resetting the radio resource utilization parameter are performed periodically.

9. The method of claim 1, further comprising increasing the radio resource utilization parameter when a time elapsed since last transport network congestion information was obtained equals a preset time period.

10. The method of claim 1, wherein the radio resource comprises a transmission time interval.

11. A base station of a communication system comprising a transport network interconnecting the base station with at least a gateway node, the communication system further comprising one or more user equipments, the base station comprising:
a transceiver configured to obtain transport network congestion information; and
a processor configured to:
adjust, based on the transport network congestion information, a radio resource utilization parameter for at least one user equipment of the one or more user equipments, wherein the radio resource utilization parameter comprises a ratio of an actual number of used radio resources for the at least one user equipment in a predefined radio resource block to a total number of radio resources in the predefined radio resource block; and
determine a discontinuous reception parameter for the at least one user equipment based on the radio resource utilization parameter,
wherein the transceiver is further configured to transmit to the at least one user equipment, the discontinuous reception parameter, to enable the at least one user equipment to go into a discontinuous reception mode.

12. A non-transitory computer-readable medium comprising, stored thereupon, a computer program for a base station of a communication system that comprises a transport network interconnecting the base station with at least a gateway node and that further comprises one or more user equipments, the computer program comprising computer program code configured to cause the base station executing the computer program code to:
obtain transport network congestion information,
adjust, based on the transport network congestion information, a radio resource utilization parameter for at least one user equipment of the one or more user equipments, wherein the radio resource utilization parameter comprises a ratio of an actual number of used radio resources for the at least one user equipment in a predefined radio resource block to a total number of radio resources in the predefined radio resource block;
determine a discontinuous reception parameter for the at least one user equipment based on the radio resource utilization parameter; and
transmit to the at least one user equipment, the discontinuous reception parameter, to enable the at least one user equipment to go into a discontinuous reception mode.

* * * * *